United States Patent [19]  
Iwakiri et al.

[11] Patent Number: 4,893,889  
[45] Date of Patent: Jan. 16, 1990

[54] OPTICAL ATTENUATOR

[75] Inventors: Toyokazu Iwakiri; Akira Sugiyama; Yoshio Kashima; Ikuo Betsui; Nobuo Suzuki, all of Tokyo, Japan

[73] Assignee: Seiko Instruments Inc., Tokyo, Japan

[21] Appl. No.: 237,893

[22] Filed: Aug. 29, 1988

[30] Foreign Application Priority Data

Sep. 4, 1987 [JP] Japan .................. 62-221485

[51] Int. Cl.$^4$ .................. G02B 6/26; G02B 6/42
[52] U.S. Cl. .................. 350/96.15
[58] Field of Search .................. 350/96.15, 96.21

[56] References Cited

U.S. PATENT DOCUMENTS 4,384,203 5/1983 Wells .................. 350/96.15
4,695,126 9/1987 Cook .................. 350/96.15

Primary Examiner—William L. Sikes
Assistant Examiner—Robert E. Wise
Attorney, Agent, or Firm—Bruce L. Adams; Van C. Wilks

[57] ABSTRACT

An optical attenuator for attenuating optical power by providing an air gap between coupled fiber ends. Both the end faces are allowed to have an inclination, thereby providing an optical attenuator with less reflected light and multiple reflection between coupled fibers.

8 Claims, 3 Drawing Sheets

OPTICAL ATTENUATOR

BACKGROUND OF THE INVENTION

This invention relates to an optical attenuator used for adjusting optical power incident on a detector in optical fiber transmission.

FIG. 6 shows a prior art optical attenuator. A reference numeral 1 denotes an incident fiber, 4 denotes an outgoing fiber, 5 denotes an optical fiber 6, 9 and 10 denote ferrules for holding fibers 1, 4 and 5 respectively, 13 denotes an end face of the incident fiber 1, 43 denotes an end face of the outgoing fiber 4, 51 and 52 denote end faces of the optical fiber 5.

The light propagated through the incident fiber 1 is emitted into space from the end face 13. A part of the light emitted into space is incident on the optical fiber 5 from the end face 51. Light propagated through optical fiber 5 is incident on the fiber 4 by way of the end faces 52 and 43, and is propagated through the fiber 4. It has been known that an attenuation in this case is determined by an air gap l between the end faces 13 and 51. For example, a structure of such prior art optical attenuator is disclosed in the Transactions of the IE/ICE, Symposium No. 2302, 1982.

However, the prior art optical attenuator shown has two defects pointed out as follows.

That is, since the fiber end faces 13 and 51 face opposite and in parallel relation to each other and are spaced apart across the air gap l, both the end faces 13 and 51 come to constitute, a Fabry-Perot interferometer to cause a multiple reflections therebetween. Thus, where a light with high coherence such as laser diode (hereinafter called LD) or the like is incident, a change in attenuation may arise due to temperature change or other cause. Moreover, since the light reflected on both fiber end faces 13, 51 returns to a light source, the optical attenuator is hard to use on a system (using LD for example) on which the returning reflected light may adversely impact.

SUMMARY OF THE INVENTION

The object of the present invention is to minimize the multiple reflections and reflected light on both fiber end faces 13 and 51. That is, the end faces of the coupled fibers are polished obliquely to an axis of the optical fiber and are disposed opposite each other to maintain a prescribed gap.

DETAILED DESCRIPTION OF PREFERRED EMBODIMENTS

A preferred embodiment of the invention will now be described in detail with reference to the accompanying drawings.

Figure 1:
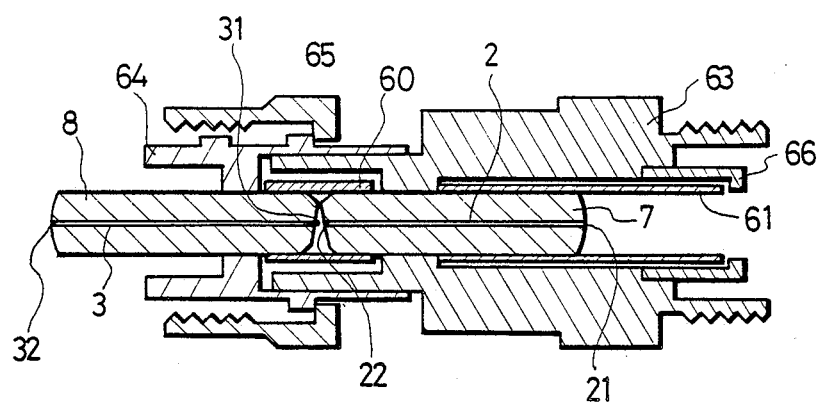
FIG. 1 is a cross sectional view showing an optical attenuator in one embodiment of the invention.

FIG. 1 represents one embodiment of an optical attenuator in accordance with the invention. A reference numeral 2 denotes an incident side fiber, 3 denotes an outgoing side fiber and, 7 and 8 denote ferrules or sleeves for holding the fibers 2 and 3, respectively. At 21 the incident side end face of the incident side fiber 2 is shown to be polished spherically. At 22 the outgoing side end face of the incident side fiber 2 is shown to be polished obliquely to an axis of the incident side fiber 2. At 31 an incident side end face of the outgoing side fiber 3 is shown to be polished obliquely to an axis of the outgoing side fiber 3. At 32 an outgoing side end face of the outgoing side fiber 3 is shown to be polished spherically, 60 denotes a holding member (like a slit sleeve, for example) for holding the ferrules 7 and 8 concurrently and thus keeping the incident side fiber 2 and the outgoing side fiber 3 coaxial. The numeral 61 denotes a holding member (like a slit sleeve, for example) for holding the ferrule 7 and the ferrule 6 illustrated in FIG. 2 concurrently, and thus keeping the incident side fiber 2 and the incident fiber 1 illustrated in FIG. 2 coaxial. The numerals 63, 64 and 65 denote members for holding the above, and fastening to a plug and an adapter which are not so indicated. A member 66 is provided for keeping the holding member 61 from coming off.

An attenuation mechanism of the invention which is illustrated in FIG. 1 will be then described with reference to FIG. 2. A reference numeral 1 denotes an incident fiber, 4 denotes an outgoing fiber, 6 and 9 denote ferrules for holding the fibers 1 and 4 respectively, and 12 and 41 denote end faces of the incident fiber 1 and the outgoing fiber 4 respectively, which are polished spherically. Like reference numerals represent like parts in FIG. 1.

The light propagated through the incident fiber 1 is incident on the incident side fiber 2 by way of the fiber end faces 12 and 21 polished spherically, and is then emitted into space from the outgoing side end face 22 of the incident side fiber 2 which is polished obliquely. A part of the light transmitted to space is incident on the outgoing side fiber 3 from the incident side end face 31 of the outgoing side fiber 3 which is polished obliquely, passes through the fiber end faces 32 and 41 polished spherically, and is incident on the outgoing fiber 4 and propagated.

Here, the attenuation is determined by air gap l between the outgoing side end face 22 of the incident side fiber 2 and the incident side end face 31 of the outgoing side fiber 3, an angle $(90° - \theta_1)$ formed by an axis of the incident side fiber 2 and the outgoing side end face 22 of the incident side fiber 2, and an angle $(90° - \theta_2)$ formed by an axis of the outgoing side fiber 3 and the incident side end face 31 of the outgoing side fiber 3. The greater l, $\theta_1$, $\theta_2$ are, the larger the attenuation becomes.

Since the outgoing side end face 22 of the incident side fiber 2 and the incident side end face 31 of the outgoing side fiber 3 are not parallel with each other, both the end faces together do not function as a Fabry-Perot interferometer. Accordingly, multiple reflections will not arise between the outgoing side end face 22 of the incident side fiber 2 and the incident side end face 31 of the outgoing side fiber 3. Further, since the outgoing side end face 22 of the incident side fiber 2 and the incident side end face 31 of the outgoing side fiber 3 are inclined to an axis of the incident side fiber 2 and an axis of the outgoing side fiber 3 respectively, the light due to Fresnel reflection at the outgoing side end face 22 of the incident side fiber 2 and the incident side end face 31 of the outgoing side fiber 3 does not propagate through the optical fiber. Then, reflections on a junction of the incident fiber 1 and the incident side fiber 2 of the optical attenuator and also on a junction of the outgoing side fiber 3 of the optical attenuator and the outgoing fiber 4 are minimized as each end face is polished spherically.

Figure 3:
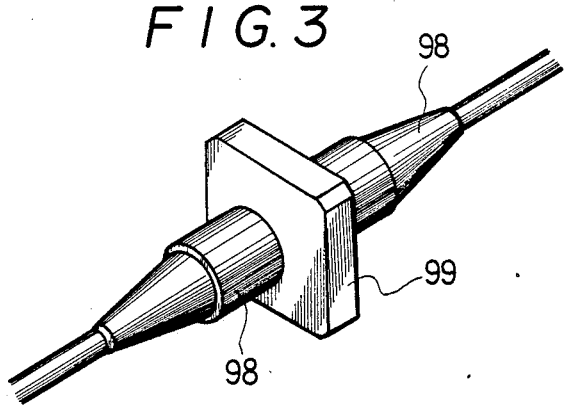
FIG. 3 is a perspective view of a fiber connector.

FIG. 3 is a perspective view of a fiber connector before the optical attenuator of the invention is mounted.

Figure 4:
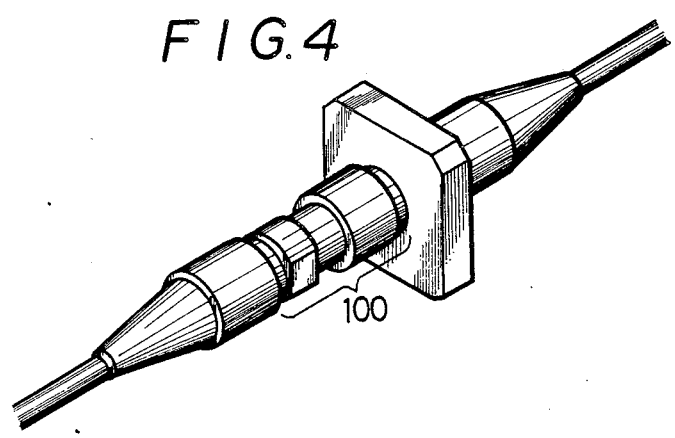
FIG. 4 is a perspective view showing a state where the optical attenuator is mounted on the fiber connectors.

A reference numeral 98 denotes a plug and 99 denotes an adapter. FIG. 4 is a perspective view showing a state where an optical attenuator 100 of the invention is mounted on the fiber connector of FIG. 3.

Figure 5:
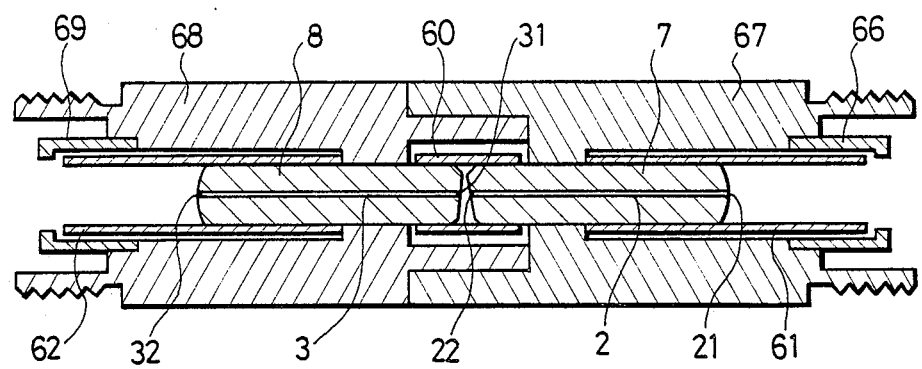
FIG. 5 is a sectional view showing an optical attenuator in another embodiment of the invention.
Figure 6:
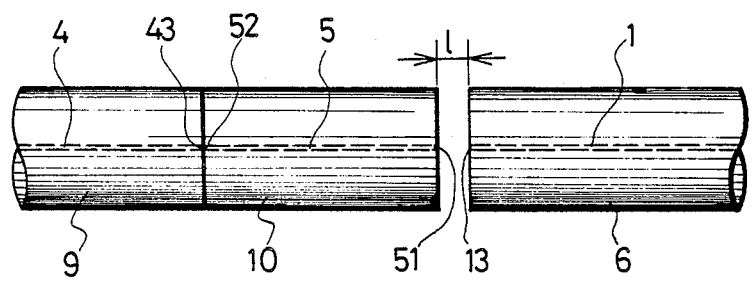
FIG. 6 is a schematic view of a prior art optical attenuator.

FIG. 5 represents another embodiment of the invention. Reference numerals 67 and 68 denote members for holding the ferrules 7 and 8 and fastening to a fiber plug not indicated. The reference numeral 62 denotes a holding member (like a slit sleeve, for example) for holding the ferrule 8 and the ferrule 9 shown in FIG. 2 concurrently, and thus keeping the outgoing side fiber 3 and the outgoing fiber 4 illustrated in FIG. 2 coaxial. Reference numeral and 69 denotes a member for keeping the holding member 62 from coming off. Like reference numerals represent like parts in FIG. 1.

As described, the construction wherein the coupled fibers are obliquely polished to an axis of the optical fiber and are disposed opposite each other to maintain a prescribed gap is effective in preventing both the fiber end faces from working as a Fabry-Perot interferometer, and reflected light on the end faces will not be propagated through the optical fiber.

Figure 2:
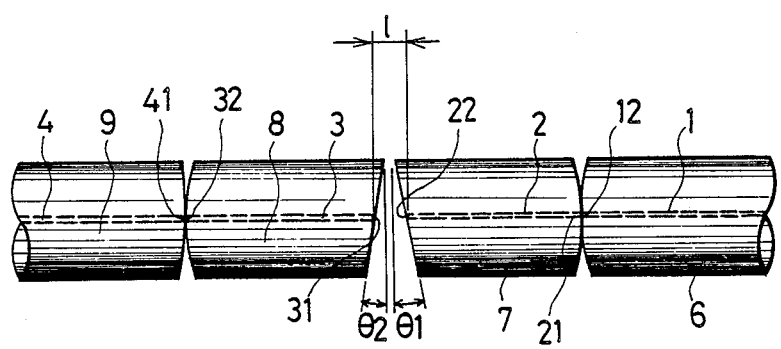
FIG. 2 is an enlarged view of an attenuation mechanism of the optical attenuator according to the invention.

In FIG. 1, FIG. 2 and FIG. 5, an antireflection coating (AR coating) formed by evaporation on the outgoing side end face 22 of the incident side fiber 2 and the incident side end face 31 of the outgoing side fiber 3 is effective in further decreasing reflected light and multiple reflections between the outgoing side end face 22 of the incident side fiber 2 and the incident side end face 31 of the outgoing side fiber 3.

The above description refers to the case where light is incident from the incident fiber 1, however, if light is incident from the outgoing fiber 4, the attenuation mechanism remains exactly the same.

As described above, the invention provides an optical attenuator which avoids an increase in reflected light and a degradation of optical signals due to multiple reflection of the light. The invention is applicable to a single mode fiber, and is advantageously inexpensive relative to prior attenuators.

We claim:

1. An optical attenuator comprising a pair of optical fibers having mutually facing non-parallel end surfaces separated by an air gap and having non facing end surfaces thereof polished sphericallly.

2. The optical attenuator as claimed in claim 1, wherein each of said mutually facing non-parallel end surfaces is provided with an antireflection coating thereon.

3. The optical attenuator of claim 1, in which at least said mutually facing end surfaces of said optical fibers are substantially coaxially aligned.

4. The optical attenuator of claim 3, in which each of said mutually facing non-parallel end surfaces is polished obliquely relative to the longitudinal axis of its respective optical fiber.

5. The optical attenuator of claim 4, in which said optical fibers are substantially coaxially aligned.

6. The optical attenuator of claim 1, comprising encasement means for supporting said optical fibers along a central axis thereof, said encasement means surrounding said optical fibers and having mutually facing non-parallel surfaces defining said gap.

7. The optical attenuator of claim 6, in which said encasement means comprises oppositely facing substantially spherical end surfaces corresponding to said spherically polished surfaces of said optical fibers.

8. The optical attenuator of claim 7, comprising means for holding said encasement means in coaxial alignment.

* * * * *